US010000043B2

(12) United States Patent
Robert et al.

(10) Patent No.: US 10,000,043 B2
(45) Date of Patent: Jun. 19, 2018

(54) MULTILAYER FILM FOR RESEALABLE PACKAGING HAVING IMPROVED RESEALING

(71) Applicant: BOSTIK SA, La Plaine Saint Denis (FR)

(72) Inventors: Christophe Robert, Thourotte (FR); Christophe Notteau, Noyon (FR); Ludovic Sallet, Compiegne (FR)

(73) Assignee: BOSTIK SA, La Plaine Saint Denis (FR)

( * ) Notice: Subject to any disclaimer, the term of this patent is extended or adjusted under 35 U.S.C. 154(b) by 190 days.

(21) Appl. No.: 14/718,215

(22) Filed: May 21, 2015

(65) Prior Publication Data

US 2015/0336362 A1 Nov. 26, 2015

(30) Foreign Application Priority Data

May 22, 2014 (FR) ..................................... 14 54597

(51) Int. Cl.

| | |
|---|---|
| ***B29C 49/22*** | (2006.01) |
| ***B32B 7/12*** | (2006.01) |
| ***B32B 25/08*** | (2006.01) |
| ***B32B 25/14*** | (2006.01) |
| ***B32B 27/30*** | (2006.01) |
| ***B32B 27/32*** | (2006.01) |
| ***B32B 27/08*** | (2006.01) |
| ***B32B 37/04*** | (2006.01) |

(52) U.S. Cl.

CPC ................ *B32B 27/08* (2013.01); *B32B 7/12* (2013.01); *B32B 27/302* (2013.01); *B32B 27/32* (2013.01); *B32B 37/04* (2013.01); *B29C 49/22* (2013.01); *B32B 2250/242* (2013.01); *B32B 2250/40* (2013.01); *B32B 2307/31* (2013.01); *B32B 2435/02* (2013.01); *B32B 2439/00* (2013.01); *B32B 2439/40* (2013.01); *Y10T 428/1352* (2015.01); *Y10T 428/24975* (2015.01); *Y10T 428/264* (2015.01)

(58) Field of Classification Search
None
See application file for complete search history.

(56) References Cited

U.S. PATENT DOCUMENTS

| | | | | |
|---|---|---|---|---|
| 2005/0100695 A1* | 5/2005 | Holbert | .................... | B32B 7/10 428/34.2 |
| 2007/0092748 A1 | 4/2007 | Suzuki et al. | | |
| 2014/0024513 A1 | 1/2014 | Robert et al. | | |

FOREIGN PATENT DOCUMENTS

| | | |
|---|---|---|
| EP | 2687362 A1 | 1/2014 |
| WO | 2012045951 A1 | 4/2012 |

OTHER PUBLICATIONS

English translation of WO 2012/045951 A1, Apr. 2012, retrieved off Australian Patent Office website on Jun. 3, 2017.*
Search Report dated Jan. 12, 2015 issued in corresponding application FR 1454597 (pp. 1-2).

* cited by examiner

*Primary Examiner* — Ramsey E Zacharia
(74) *Attorney, Agent, or Firm* — Millen White Zelano and Branigan, PC

(57) ABSTRACT

Multilayer film comprising two thin layers D and E of a thermoplastic material bonded to one another by a continuous layer A that is a hot-melt pressure-sensitive adhesive composition:

- a composition of styrene block copolymers (a mixture of diblock and triblock copolymers); and
- one or more tackifying resins with a softening temperature of 5 to 140° C.;
- the adhesive layer A
  - connected to the layer D via a tie layer B, and
  - connected to the layer E via a tie layer C,
- B and C being polyethylene or polypropylene modified by a cyclic anhydride of an unsaturated acid having from 4 to 8 carbon atoms,
- manufacture of the film by coextrusion, and
- Use of the film for resealable packagings.

19 Claims, No Drawings

MULTILAYER FILM FOR RESEALABLE PACKAGING HAVING IMPROVED RESEALING

A subject matter of the present invention is a multilayer film comprising a layer composed of an extrudable hot-melt pressure-sensitive adhesive composition, a process for the manufacture of said film and its use for the manufacture of resealable packagings (or cartons) intended in particular for the packaging of foodstuffs, in particular of perishable foodstuffs.

Extrudable hot-melt pressure-sensitive adhesive compositions intended for use for the manufacture of resealable packagings (or cartons) are known by the applications WO 02/064694, WO 12/045950, WO 12/045951 and WO 14/020243.

Resealable packagings, for example in the form of cartons or bags, are used in the food processing industry and mass marketing for packaging perishable foods, in particular fresh products. Such packagings are also described by the patent EP 1053952.

After the packaging has been opened for the first time and a portion of the foodstuff present therein has been consumed, the consumer can manually reseal the packaging in a substantially hermetic fashion and consequently provide, if appropriate after placing in a refrigerator, the storage of the remaining portion of the foodstuff. A sequence of reopenings and resealings is also possible.

These packagings generally comprise a container (or receptacle) and a seal forming a lid, which are hermetically attached to one another by welding.

The receptacle, which is more or less deep and relatively rigid, is composed of a multilayer sheet (also described as complex or composite sheet) having a minimum thickness of 200 μm, generally between 200 and 1000 μm. This sheet is thermoformed, so as to exhibit a flat bottom, on which the foodstuff rests, and a perimeter in the form of a flat band. This perimeter, generally parallel to the bottom, is bonded by welding to the flexible and flat seal, which is composed of a multilayer film (also described as complex or composite film), generally with a thickness of between 40 and 150 μm, and which is sometimes denoted by the name of sealing film.

During the opening of the packaging, the sealing film is manually separated from the receptacle at the flat band of the perimeter. This operation results in the appearance of an adhesive layer at this flat band, both on the sealing band and on the receptacle band which were previously in contact. These two adhesive layers (continuous or noncontinuous) "referred to as daughters" result from the rupturing of an initial or "mother" adhesive layer or, possibly, from its separation (or detachment) from one of the two layers of the multilayer complex film which are adjacent to it. The initial adhesive layer is thus one of the layers of said multilayer complex film, which is itself an element included either in the composite sheet which forms the receptacle or, preferably, in the sealing film.

The two daughter adhesive layers which are present, after opening the packaging, on the bands located on the respective perimeter of the receptacle and of the seal are thus facing one another. Thus, it is sufficient to reposition the seal over the receptacle, in accordance with their position in the packaging before opening, in order to bring the two bands of daughter adhesive layers back into contact. Simple manual pressure then makes it possible to obtain the resealing of the packaging.

The adhesive composition which forms the mother and daughter adhesive layers is thus necessarily a pressure-sensitive adhesive (PSA).

The extrudable pressure-sensitive adhesive compositions described in the abovementioned patent applications are hot-melt compositions comprising a tackifying resin and a styrene block copolymer including an elastomer block. The hot-melt pressure-sensitive adhesive compositions are also commonly known as HMPSA compositions, corresponding to the initials of the phrase Hot-Melt Pressure-Sensitive Adhesive. These are substances, solid at ambient temperature, which comprise neither water nor solvent. Applied in the molten state, they solidify when they are cooled, thus forming an adhesive layer which provides the bonding between the two thin layers of thermoplastic polymer material to be assembled, while providing the corresponding packaging with advantageous opening and resealing properties.

Furthermore, these hot-melt pressure-sensitive adhesive (or HMPSA) compositions, which are prepared by hot melting the ingredients thereof, additionally exhibit advantages of being able to be put into the form of granules (with a size of between 1 and 10 mm) by means of a stage of extrusion carried out directly under hot conditions after the mixing stage, for example by means of a twin-screw extruder provided with a tool for cutting the extruded product.

By virtue of the granules thus obtained, the three-layer film which is composed of the layer of hot-melt pressure-sensitive adhesive composition and of the two thin layers of thermoplastic polymer material to be assembled can be conveniently manufactured by coextrusion, for example by feeding a bubble blowing device with the constituent materials of the three layers in the form of granules having the size defined above.

The ease of opening such packagings is closely related to the properties of the PSA and more particularly to the force which has to be applied, during the opening of the packaging (hereinafter denoted first opening), in order to obtain the rupturing of the mother adhesive layer and/or its separation from one of the two layers which are adjacent to it in the multilayer composite film mentioned above.

The ability of the packaging to be resealed and the quality of the resealing obtained (hereinafter denoted first resealing) are also important in order to again make available a packaging which is substantially hermetic and thus capable of providing the storage of its contents. The quality of the first resealing is also closely related to the properties of the PSA. It is evaluated by the force which has to be applied, during the reopening (hereinafter denoted by second opening), in order to again obtain the rupturing and/or the detachment of the adhesive layer which was formed by the repositioning of the two daughter adhesive layers, followed by the manual pressure applied to the perimeter of the packaging.

Patent application EP 1053952 teaches a resealable packaging with a container which comprises a laminatable layer, an adhesive layer and a tearable welding layer. This adhesive is a pressure-sensitive adhesive which is described in a very general fashion.

Application US2013/0029553 describes a multilayer film for resealable packagings comprising a heat-weldable layer consisting of a specific amorphous polyethylene terephthalate, a PSA layer and at least one tie layer consisting of a copolymer of ethylene and methyl acrylate.

Application WO 12/045951 discloses a multilayer film comprising two thin layers of thermoplastic materials bonded to one another via a layer of an adhesive composition based on styrene block copolymers, said layer having a thickness of between 7 and 300 μm. This multilayer film, which is suitable for the manufacture of resealable packagings, makes it possible to render the opening of the latter easier, by lowering the force of the first opening, while maintaining the quality of the subsequent resealing (or first resealing) substantially at the same level.

However, in the context of the continual improvement in the resealable packagings provided by industry to the consumer, it now appears increasingly necessary to improve the resealing performance of said packagings.

It is thus an aim of the present invention to provide a multilayer film suitable for the manufacture of resealable packaging which makes it possible—while maintaining easy first opening of the packaging—to improve the quality of its resealing (or first resealing), so as to more effectively ensure to the consumer the storage of the remaining portion of the perishable foodstuff.

Another aim of the invention is thus to increase the force of second opening, while maintaining the force of first opening at an acceptable level.

Another aim of the present invention is to provide a multilayer film which makes it possible to achieve the preceding aims at ambient temperature, corresponding to the temperature at which the consumer opens and reseals the packaging.

Another aim of the present invention is to provide a multilayer film capable of being manufactured by coextrusion from starting materials conditioned in the form of granules, in particular by coextrusion by bubble blowing, for the purpose of the manufacture of a resealable packaging.

It has now been found that these aims can be achieved, in all or in part, by means of the multilayer film according to the invention which is described below.

A subject matter of the present invention is thus firstly a multilayer film comprising two thin layers D and E of a thermoplastic material bonded to one another by a continuous layer A which has a thickness ranging from 7 to 50 μm and is composed of a hot-melt pressure-sensitive adhesive composition a having a melt flow index (or MFI) ranging from 0.01 to 200 g/10 minutes and comprising, on the basis of the total weight of said composition:

from 40 to 70% by weight of a composition a1 formed of styrene block copolymers comprising at least one elastomer block, said composition a1 being composed, on the basis of its total weight:
- of 30 to 90% by weight of at least one diblock copolymer chosen from the group consisting of SI, SBI, SIB, SB, SEB, and SEP, and
- of 10 to 70% by weight of at least one triblock copolymer chosen from the group consisting of SIS, SIBS, SBS, SEBS and SEPS;
- the total content of styrene units of said composition a1 varying from 10 to 40% by weight, on the basis of the total weight of a1; and of 30 to 60% by weight of one or more tackifying resins a2 having a softening temperature of between 5 and 140° C.;

said multilayer film being in addition characterized in that the adhesive layer A is:

connected to the layer D via a tie layer B, and connected to the layer E via a tie layer C, each of the two layers B and C being respectively composed of a composition b and c comprising a polyethylene or polypropylene which are modified by a cyclic anhydride of an unsaturated acid having from 4 to 8 carbon atoms.

In addition to the percentages indicated above, all the percentages used generally in the present text to denote the amounts of ingredients of a composition correspond, unless otherwise indicated, to percentages expressed by weight on the basis of the total weight of said composition.

The characteristics of the layers A, B, C, D and E included in the multilayer film according to the invention are now described below in more detail.

Description of the Constituent Composition of the Adhesive Layer A:

The composition a1 which is included in the constituent HMPSA composition a of the adhesive layer A comprises one or more styrene block copolymers with a weight-average molar mass $M_w$ generally of between 50 kDa and 500 kDa.

These styrene block copolymers are composed of blocks of different polymerized monomers including at least one polystyrene block and are prepared by radical polymerization techniques.

Unless otherwise indicated, the weight-average molar masses $M_w$ which are given in the present text are expressed in daltons (Da) and are determined by Gel Permeation Chromatography, the column being calibrated with polystyrene standards.

The triblock copolymers include two polystyrene blocks and one elastomer block. They can assume various structures: linear, star-branched (also known as radial), branched or comb. The diblock copolymers including one polystyrene block and one elastomer block.

The triblock copolymers have the general formula:

$$ABA \quad (I)$$

in which:

A represents a nonelastomeric styrene (or polystyrene) block, and

B represents an elastomer block which can be:
- polyisoprene. The block copolymer then has the structure: polystyrene-polyisoprene-polystyrene and the name: SIS;
- polyisoprene, followed by a polybutadiene block. The block copolymer then has the structure: polystyrene-polyisoprene-polybutadiene-polystyrene and the name: SIBS;
- polybutadiene. The block copolymer then has the structure: polystyrene-polybutadiene-polystyrene and the name: SBS;
- completely or partially hydrogenated polybutadiene. The block copolymer then has the structure: polystyrene-poly(ethylene/butylene)-polystyrene and the name: SEBS;
- completely or partially hydrogenated polyisoprene. The block copolymer then has the structure: polystyrene-poly(ethylene/propylene)-polystyrene and the name: SEPS.

The diblock copolymers have the general formula:

$$A\text{-}B \quad (II)$$

in which A and B are as defined above.

When the composition a1 comprises several styrene triblock copolymers, the latter being chosen from the group consisting of SIS, SBS, SEPS, SIBS and SEBS, it is clearly understood that said triblocks can originate from just one or from several of these five families of copolymers. It is the same, mutatis mutandis, for the diblock copolymers.

It is preferable to use a composition a1 comprising a triblock copolymer and a diblock copolymer having the same elastomer block, due in particular to the fact that such mixtures are commercially available.

According to a particularly preferred alternative embodiment, the content of diblock copolymer in the composition a1 can vary from 40 to 90%, preferably from 50 to 90% and more preferably still from 50 to 60%.

According to a particularly advantageous embodiment of the constituent composition a of the layer A included in the multilayer film according to the invention, the composition a1 is composed of an SIS triblock copolymer and of an SI diblock copolymer. In this case, the total content of styrene units of the composition a1 preferably varies from 10 to 20%.

The triblock copolymers included in the composition a1 preferably have a linear structure.

The styrene block copolymers comprising an elastomer block, in particular of SI and SIS type, which can be used in the composition a are commercially available, often in the form of triblock/diblock mixtures.

Kraton® D1113BT from Kraton and Quintac® 3520 from Zeon Chemicals are examples of compositions a1 composed of SIS and SI.

Kraton® D1113BT is a composition which has an overall content of styrene units of 16%, and which is composed of 45% of linear SIS triblock copolymer with an $M_w$ of approximately 250 kDa and of 55% of SI diblock copolymer with an $M_w$ of approximately 100 kDa. Quintac® 3520 is a composition which is composed, respectively, of 22% and 78% of linear SIS triblock ($M_w$ approximately 300 kDa) and SI diblock ($M_w$ approximately 130 kDa), the total content of styrene units of which is 15%.

The constituent HMPSA composition a of the layer A also comprises one or more tackifying resins a2 having a softening temperature between 5 and 140° C.

The tackifying resin or resins a2 which can be used have weight-average molar masses $M_w$ generally of between 300 and 5000 Da and are chosen in particular from:

(i) rosins of natural or modified origin, such as, for example, the rosin extracted from pine gum, wood rosin extracted from tree roots and their derivatives which are hydrogenated, dehydrogenated, dimerized, polymerized or esterified by monoalcohols or polyols, such as glycerol;

(ii) resins obtained by hydrogenation, polymerization or copolymerization (with an aromatic hydrocarbon) of mixtures of unsaturated aliphatic hydrocarbons having approximately 5, 9 or 10 carbon atoms resulting from petroleum fractions;

(iii) terpene resins generally resulting from the polymerization of terpene hydrocarbons, such as, for example, monoterpene (or pinene), in the presence of Friedel-Crafts catalysts, which are optionally modified by the action of phenols;

(iv) copolymers based on natural terpenes, for example styrene/terpene, α-methylstyrene/terpene and vinyltoluene/terpene.

The softening temperature (or point) of the tackifying resins which can be used in the composition according to the invention can vary from 5 to 140° C. The softening temperature is determined in accordance with the standardized test ASTM E 28, the principle of which is as follows. A brass ring with a diameter of approximately 2 cm is filled with the test resin in the molten state. After cooling to ambient temperature, the ring and the solid resin are placed horizontally in a thermostatically controlled bath of glycerol, the temperature of which can vary by 5° C. per minute. A steel ball with a diameter of approximately 9.5 mm is centred on the disc of solid resin. The softening temperature is—during the phase of rise in the temperature of the bath at a rate of 5° C. per minute—the temperature at which the disc of resin yields by a height of 25.4 mm under the weight of the ball.

According to a preferred alternative form, use is made of aliphatic resins belonging to the categories (ii) or (iii), for which mention may be made, as examples of commercially available resin, of:

(ii) Escorez® 1310 LC, available from Exxon Chemicals, which is a resin obtained by polymerization of a mixture of unsaturated aliphatic hydrocarbons having approximately 5 carbon atoms and which has a softening temperature of 94° C. and an $M_w$ of approximately 1800 Da; Escorez® 5400, also from Exxon Chemicals, which is a resin obtained by polymerization and then hydrogenation of a mixture of unsaturated aliphatic hydrocarbons having approximately 9 or 10 carbon atoms and which has a softening temperature of 100° C. and an $M_w$ of approximately 570 Da;

(iii) Dercolyte® S115, available from Dérivés Résiniques et Terpéniques (or DRT), which is a terpene resin having a softening temperature of 115° C. and an $M_w$ of approximately 2300 Da.

According to a preferred alternative form, the constituent HMPSA composition a of the layer A is composed essentially:

of 40 to 70% of the composition a1 of styrene block copolymers; and of 30 to 60% of at least one tackifying resin a2 having a softening temperature of between 5 and 140° C.

According to another preferred alternative form, the constituent HMPSA composition a of the layer A comprises or is composed essentially:

of 50 to 70% of the composition a1 of styrene block copolymers; and of 30 to 50% of at least one tackifying resin a2 having a softening temperature of between 5 and 140° C.

According to yet another preferred alternative form, the constituent HMPSA composition a of the layer A can also comprise, in addition to the composition a1 and the tackifying resin(s) a2, from 0.1 to 2% of one or more stabilizers (or antioxidants). These compounds are introduced in order to protect the composition from damage resulting from a reaction with oxygen which is capable of being formed by the action of heat, light or residual catalysts on certain starting materials, such as the tackifying resins. These compounds can include primary antioxidants, which trap the free radicals and are generally substituted phenols, such as Irganox® 1010 from CIBA. The primary antioxidants can be used alone or in combination with other antioxidants, such as phosphites, for example Irgafos® 168, also from CIBA, or also with UV stabilizers, such as amines.

The composition a can also comprise a plasticizer but in an amount not exceeding 5%. Use may be made, as plasticizer, of a paraffinic and naphthenic oil (such as Primol® 352 from Esso) optionally comprising aromatic compounds (such as Nyflex 222B).

Finally, the composition a can comprise inorganic or organic fillers, pigments or dyes.

The melt flow index (or MFI) of the hot-melt pressure-sensitive adhesive composition a of the layer A is measured at 190° C. and for a total weight of 2.16 kg, in accordance with condition d) of the standard ISO 1133. The MFI is the weight of composition (placed beforehand in a vertical cylinder) which flows in 10 minutes through a die having a fixed diameter, under the effect of a pressure exerted by a loaded piston having a total weight of 2.16 kg. Unless otherwise mentioned, the MFI values indicated in the present text were measured under these same conditions.

The hot-melt pressure-sensitive adhesive compositions of the layer A having an MFI ranging from 2 to 100 g/10 minutes are more particularly preferred.

Description of the Constituent Compositions b and c Respectively of the Tie Layers B and C:

The tie layers B and C are also denoted by the name of "intermediate layers".

These two layers are respectively composed of identical or different compositions b and c which each comprise a polyethylene or polypropylene modified by a cyclic anhydride of an unsaturated dicarboxylic acid having from 4 to 8 carbon atoms.

Maleic anhydride is a very particularly preferred cyclic anhydride.

"Polyethylene modified" by said anhydride is understood to denote either a copolymer of ethylene and said anhydride or an ethylene homopolymer or copolymer grafted by said anhydride.

The copolymers of ethylene and anhydride are, for example, random copolymers comprising:

- a repeat unit derived from ethylene,
- a repeat unit derived from the cyclic anhydride, and optionally
- a repeat unit derived from an α-olefin which can have from 3 to 20 carbon atoms. The α-olefins employed can be propylene, 1-butene, 1-hexene, 4-methyl-1-pentene, 1-octene, 1-decene, 1-tetradecene and 1-octadecene.

The copolymers of ethylene and anhydride can comprise from 0.3 to 20% by weight of the anhydride defined above and—when the corresponding comonomer is present—from 20 to 30% by weight of α-olefin. The repeat unit derived from ethylene can represent from approximately 20, 40 or 50% to approximately 70, 80, 90 or 95% by weight of the copolymer.

The polyethylene homopolymers or copolymers can include a linear polyethylene such as HDPE (High Density PolyEthylene), a linear low density polyethylene (LLDPE), a very low density or ultralow density polyethylene (VLDPE or ULDPE) or a branched polyethylene, such as low density polyethylene. Such polyethylenes can be prepared by several methods, including polymerization in the presence of a Ziegler-Natta catalyst, polymerization catalyzed by metallocene or radical polymerization.

The grafted homopolymers (or copolymers) of ethylene are prepared by reacting a preformed ethylene (co)polymer with the compound to be grafted by heating, with or without a catalyst which generates free radicals (such as an organic peroxide) and in the presence or absence of a solvent.

None of the constituent atoms of the grafted radical, which is often added by a radical reaction, is incorporated in the main chain of the ethylene (co)polymer. The grafted radical is connected, as pendant group, to some repeat units of the main chain of the (co)polymer.

The ethylene polymer which is grafted by maleic anhydride is either a homopolymer or a copolymer. Such a copolymer is, for example, a random copolymer comprising, in addition to the repeat unit derived from ethylene, a repeat unit derived from an α-olefin as defined above.

It is preferable to employ compositions b and c composed essentially of PolyEthylene modified by maleic anhydride and very particularly of LLDPE modified by maleic anhydride.

Many polyethylenes modified by maleic anhydride are available commercially.

Mention may thus be made of Bynel® 4206, sold by DuPont, which is an LLDPE modified by maleic anhydride, or also Orevac® 18360, sold by Arkema, and Bynel® 41E865 of DuPont, which are both LLDPEs grafted by maleic anhydride.

According to a preferred alternative form, the modified polyethylene included in the compositions b and c is a grafted homopolymer or copolymer with ethylene.

According to an alternative form which is also preferred, the compositions b and c of the layers B and C are identical.

Description of the Constituent Composition of the Layers D and E:

The adhesive layer A makes it possible, via the tie layers B and C, to provide the bonding between a laminatable thin layer D and a sealable and cleavable thin layer E.

The laminatable layer can be laminated with other layers for the preparation of the packaging, for example with a rigid layer for the preparation of the receptacle.

The sealable and cleavable layer makes it possible to provide, at the perimeter along which the receptacle is bonded by welding to the seal, the first opening of the packaging, by means of a cleavable embrittled region. After opening, the embrittled region results in the appearance of:

- the mother adhesive layer on the sealing band and/or on the receptacle band which were in contact in the closed packaging, and/or
- two daughter adhesive layers which result from the rupturing of the mother adhesive layer and which are located on the sealing band and/or the receptacle band.

The material which can be used to form the two layers D and E is generally a thermoplastic polymer (identical or different for the two layers), such as:

- polyethylene (PE),
- polypropylene (PP),
- a copolymer based on ethylene and propylene,
- polyamide (PA),
- polyethylene terephthalate (PET), or also
- an ethylene-based copolymer, such as, for example, a copolymer grafted with maleic anhydride, a copolymer of ethylene and vinyl acetate (EVA), a copolymer of ethylene and vinyl alcohol (EVOH), or a copolymer of ethylene and an alkyl acrylate, such as methyl acrylate (EMA) or butyl acrylate (EBA),
- polystyrene (PS),
- polyvinyl chloride (PVC),
- polyvinylidene fluoride (PVDF),
- a lactic acid polymer (PLA), or
- polyhydroxyalkanoate (PHA).

It is preferable to use, to form the two layers D and E, a polyolefinic material, very particularly PE and more preferably still a low density PE (also denoted by the name of Low Density PolyEthylene or LDPE).

According to another alternative embodiment, the multilayer film according to the invention comprises, in addition to the five layers A, B, C, D and E, other thin layers necessary for the preparation of the packaging, such as, for example:

- a rigid layer necessary for the mechanical strength of the receptacle, or
- a printable layer, or
- a layer having a barrier effect against oxygen, water vapour or else carbon monoxide.

The materials which can be used to form said layers can be identical or different and generally comprise thermoplastic polymers which can be chosen from the polymers mentioned above for the layers D and E.

The thickness of the layer A can vary, preferably, from 8 to 25 μm and more preferably still from 10 to 20 μm.

The thickness of the tie layers B and C is, for its part, generally between 1 and 10 μm, preferably between 2 and 8 μm.

The thickness of the two layers D and E and also of the other layers possibly employed in the multilayer film according to the invention is capable of varying within a wide range extending from 5 to 150 μm.

According to an alternative embodiment, the multilayer film according to the invention is a film comprising five layers consisting of the adhesive layer A, the two intermediate layers B and C and the two external layers D and E, according to the sequence D/B/A/C/E in which the "/" sign means that the faces of the layers concerned are in direct contact.

The present invention also relates to a process for the manufacture of a multilayer film as defined above, characterized in that it comprises the coextrusion of the hot-melt pressure-sensitive adhesive composition a, of the compositions b and c and of the constituent materials of the layers D and E.

Preferably, the constituent compositions and materials of the layers A, B, C, D and E are fed into the coextrusion device in the form of granules with a size of between 1 and 10 mm, preferably between 2 and 5 mm. Thus, the pressure-sensitive adhesive composition a employed in the multilayer film according to the invention makes it possible, particularly advantageously, to provide both the properties required for said film and the possibility of a presentation of said composition a in the form of the abovementioned granules. The other layers possibly included in the multilayer film can be obtained either by the incorporation, in the coextrusion device, of the corresponding constituent materials in the form of granules of the same size or by a process of laminating the film directly resulting from the coextrusion, for example employing a polyurethane-based adhesive.

The adhesive composition a can be prepared, in this form of granules, by simple mixing of its ingredients under hot conditions, between 150 and 200° C., preferably at approximately 160° C., using a twin-screw extruder equipped with a tool for cutting up the product extruded at the outlet of the die.

The bubble blowing coextrusion process (also known under the name of "blown film coextrusion process") is more particularly preferred. In a way known to a person skilled in the art, this processes comprises:

- the melting, in separate extruders, of the constituent compositions and materials of the layers A, B, C, D and E, then
- the passing of the corresponding streams through an assembly of annular and concentric dies, so as to form a tubular bubble comprising several layers, in the order corresponding to that desired for the final structure, then
- the radial expansion (relative to the annular die) and the drawing (in the axial direction) of the bubble, then
- the cooling of the bubble.

The geometrical characteristics of the dies, as well as the parameters of the process, such as the degree of radial expansion and the drawing rate, are set so as to obtain the thicknesses desired for the various constituent layers of the multilayer film. Reference is made in particular, for a further description of the bubble blowing coextrusion process, to the patent application US2013/0029553.

The present invention also relates to the use of the multilayer film as described above for the manufacture of resealable packagings.

The use for the manufacture of resealable cartons is particularly advantageous and, according to a particularly preferred embodiment, for the manufacture of the sealing film of these cartons.

The following examples are given purely by way of illustration of the invention and should not under any circumstances be interpreted as limiting the scope thereof.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 14.54597, filed May 22, 2015, are incorporated by reference herein.

EXAMPLE A (REFERENCE): COMPOSITION A OF THE LAYER A

A composition composed, on the % weight/weight basis, of 59.5% of Kraton® D1113BT, 25% of Escorez® 1310 LC, 15% of Dercolyte® S115 and 0.5% of Irganox® 1010 is prepared, in the form of a viscous liquid, by simple mixing of the ingredients at 160° C. using a twin-screw extruder.

An MFI of 57 g/10 minutes is measured.

EXAMPLE B (REFERENCE): THREE-LAYER D/A/E FILM COMPOSED OF A LAYER A OF THE COMPOSITION OF EXAMPLE A

This three-layer film is manufactured using a bubble blowing coextrusion pilot-scale device operated continuously, in which three extruders are fed:

- for one, with a composition a of example A, and
- for the other two, with LDPE;

the three compositions being in the form of granules with a size of approximately 4 mm.

The parameters of the process are adjusted so as to manufacture a three-layer film composed:

- as layer A, of a layer with a thickness of 15 μm consisting of the composition of example A,
- as laminatable thin layer D, of a layer with a thickness of 30 μm consisting of LDPE;
- as sealable and cleavable thin layer E, of a layer with a thickness of 15 μm also consisting of LDPE.

Mention may be made, among the parameters normally fixed, of a degree of radial expansion of the bubble equal to 3, a drawing rate of 7 m/minute and an overall throughput of 11 kg/hour.

The three-layer film thus obtained has a total thickness of 60 μm and a length of 50 m and is packaged in the form of a reel with a machine width of 250 mm.

Measurement of the Force of First Opening by T-Peeling at 23° C.:

A sample in the form of a rectangular sheet with A4 format (21×29.7 cm) is cut out from the three-layer film thus obtained.

The external face of the laminatable layer D of this sample is:

- in a first step, subjected to a corona surface treatment (using a plasma), then in a second step, laminated to a PET film with a thickness of 23 μm using a polyurethane-based solvent-based adhesive and using a coating device of the Mayer bar type.

The rectangular sheet is then placed under a pressure for 24 h.

Said rectangular sheet is then folded along a line located in its middle and parallel to the small side of the rectangle, resulting in the sealable and cleavable layer E being brought into contact with itself.

Partial sealing is then carried out using two heating clamping jaws at 130° C. applied under a pressure of 6 bar for 1 second, so as to obtain sealed regions of rectangular shape (8 cm in length and 1 cm in width) positioned perpendicularly to the folding line. Each sealed region is cut out in order to obtain a tensile test specimen in which the sealed region with a length of 8 cm is extended (at that of its ends which is opposite the folding line) by two strips of approximately 2 cm in length left free and unsealed.

These two free strips are attached to two holding devices (known as jaws) respectively connected to a stationary part and a movable part of a tensile testing device which are located on a vertical axis. This tensile testing device is a dynamometer.

While a drive mechanism imparts a uniform rate of 300 mm/minute to the movable part, resulting in the peeling of the two sealed layers, the ends gradually move along a vertical axis with the formation of an angle of 180°. A force sensor connected to said movable part measures the force withstood by the test specimen thus held. The measurement is carried out in a climate controlled chamber maintained at a temperature of 23° C.

The force obtained is shown in table 1.

Measurement of the Force of Second Opening by T-Peeling at 23° C.:

The two parts of the preceding test specimen are, after peeling, repositioned facing one another and brought into contact manually. They are then subjected to a pressure exerted by means of a roller with a weight of 2 kg, with which a to-and-fro movement is carried out along a direction parallel to the length of the test specimen.

A tensile test specimen is thus obtained which is identical in shape to that prepared for the preceding peeling test, which is then repeated.

The force obtained is shown in table 1.

EXAMPLES 1-3: FILMS COMPRISING FIVE LAYERS D/B/A/C/E COMPRISING A LAYER A CONSISTING OF THE COMPOSITION OF EXAMPLE A

Example B is repeated, the coextrusion process being modified so as to add, to the three-layer film, two layers B and C having the same thickness of 5 μm and the same composition, namely an LLDPE modified by maleic anhydride as shown in table 1.

A film comprising five layers with a total thickness equal to 70 μm is obtained.

The forces of 1st and 2nd opening are shown in table 1.

The results for force of 1st opening are greater than that obtained for example B but correspond to a quality of opening of resealable packaging which is entirely acceptable.

The results obtained for the force of 2nd opening reveal a clear increase with respect to example B, which significantly indicates an improvement in the quality of the resealing of the resealable packaging, following after its 1st opening.

TABLE 1

| | Example B | Example 1 | Example 2 | Example 3 |
|---|---|---|---|---|
| Constituent material of the two tie layers B and C | Not concerned | LLDPE grafted by maleic anhydride (Bynel ® 41E865) | LLDPE grafted by maleic anhydride (Orevac ® 18360) | LLDPE modified by maleic anhydride (Bynel ® 4206) |
| Force of 1st opening (N/cm) | 3.36 | 5.58 | 7.37 | 10.67 |
| Force of 2nd opening (N/cm) | 0.85 | 1.19 | 1.92 | 3.47 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A multilayer film comprising a laminatable layer D and a sealable and cleavable layer E of a thermoplastic material bonded to one another by a continuous layer A which has a thickness ranging from 7 to 50 μm and is composed of a hot-melt pressure-sensitive adhesive composition a having a melt flow index (or MFI) ranging from 0.01 to 200 g/10 minutes and comprising, on the basis of the total weight of said composition a:

from 40 to 70% by weight of a composition a1 formed of styrene block copolymers comprising at least one elastomer block, said composition a1 comprising, on the basis of its total weight:

30 to 90% by weight of at least one diblock copolymer of SI, SBI, SIB, SB, SEB, or SEP, and 10 to 70% by weight of at least one triblock copolymer of SIS, SIBS, SBS, SEBS or SEPS;

the total content of styrene units of said composition a1 varying from 10 to 40% by weight, on the basis of the total weight of a1; and 30 to 60% by weight of one or more tackifying resins a2 having a softening temperature of between 5 and 140° C.;

wherein in said multilayer film the adhesive layer A is:

connected to the layer D via a tie layer B, and connected to the layer E via a tie layer C, each of the two layers B and C having respectively a thickness of 1-10 μm and being respectively composed of a composition b and c comprising a polyethylene or polypropylene which are modified by a cyclic anhydride of an unsaturated acid having from 4 to 8 carbon atoms.

2. The multilayer film according to claim 1, wherein the content of diblock copolymer in the composition a1 varies from 40 to 90%.

3. The multilayer film according to claim 1, wherein the composition a1 comprises an SIS triblock copolymer and of an SI diblock copolymer.

4. The multilayer film according to claim 1, wherein the tackifying resin or resins a2 have weight-average molar masses $M_w$ of between 300 and 5000 Da and are:

(i) rosins of natural or modified origin;

(ii) resins obtained by hydrogenation, polymerization or copolymerization (with an aromatic hydrocarbon) of mixtures of unsaturated aliphatic hydrocarbons having approximately 5, 9 or 10 carbon atoms resulting from petroleum fractions;

(iii) terpene resins resulting from the polymerization of terpene hydrocarbons, in the presence of Friedel-Crafts catalysts, which are optionally modified by the action of phenols;

(iv) copolymers based on natural terpenes.

5. The multilayer film according to claim 4, wherein the tackifying resin or resins a2 are aliphatic resins belonging to the categories (ii) or (iii).

6. The multilayer film according to claim 1, wherein the compositions b and c comprise a polyethylene or polypropylene modified by maleic anhydride.

7. The multilayer film according to claim 1, wherein the compositions b and c are LLDPE modified by maleic anhydride.

8. The multilayer film according to claim 1, wherein the compositions b and c are identical.

9. The multilayer film according to claim 1, wherein the layers D and E are composed of a polyolefinic material.

10. The multilayer film according to claim 1, wherein the thickness of the layer A varies from 8 to 25 μm.

11. The multilayer film according to claim 1, wherein the thickness of the layer A varies from 10 to 20 μm and the thickness of the tie layers B and C is between 2 and 8 μm.

12. The multilayer film according to claim 1, that is a film comprising five layers: the adhesive layer A, the two intermediate layers B and C and the two external layers D and E, according to the sequence D/B/A/C/E in which the "/" sign means that the faces of the layers concerned are in direct contact.

13. A process for the manufacture of a multilayer film as defined in claim 1, comprising coextrusion of the hot-melt pressure-sensitive adhesive composition a, of the compositions b and c and of the constituent materials of the layers D and E.

14. The process for the manufacture of the multilayer film according to claim 13, wherein the coextrusion is carried out by bubble blowing.

15. A resealable packaging comprising in said resealable packaging a multilayer film according to claim 1.

16. The multilayer film according to claim 4, wherein the rosin is a rosin extracted from pine gum, wood rosin extracted from tree roots and their derivatives which are hydrogenated, dehydrogenated, dimerized, polymerized or esterified by monoalcohols or polyols.

17. The multilayer film according to claim 4, wherein the terpene resin is monoterpene.

18. The multilayer film according to claim 4, wherein the copolymer is styrene/terpene, α-methylstyrene/terpene or vinyltoluene/terpene.

19. The multilayer film according to claim 1, wherein layers D and E respectively independently each have a thickness of 1-150 μm.

* * * * *